United States Patent
Levitan

(10) Patent No.: US 7,409,219 B2
(45) Date of Patent: Aug. 5, 2008

(54) SYSTEM AND METHOD FOR RECOVERING A LOST OR STOLEN WIRELESS DEVICE

(75) Inventor: Benjamin C. Levitan, Raleigh, NC (US)

(73) Assignee: Nextel Communications Inc., Overland Park, KS (US)

( * ) Notice: Subject to any disclaimer, the term of this patent is extended or adjusted under 35 U.S.C. 154(b) by 322 days.

(21) Appl. No.: 11/242,428

(22) Filed: Sep. 29, 2005

(65) Prior Publication Data

US 2007/0072620 A1    Mar. 29, 2007

(51) Int. Cl.
*H04Q 7/20* (2006.01)
(52) U.S. Cl. .............. 455/456.6; 455/456.5; 455/456.1; 340/539.13; 340/539.1
(58) Field of Classification Search .............. 455/456.6, 455/456.5, 456.1, 418; 340/539.13, 539.1
See application file for complete search history.

(56) References Cited

U.S. PATENT DOCUMENTS

| | | | |
|---|---|---|---|
| 6,006,096 A * | 12/1999 | Trompower | 455/456.2 |
| 2001/0026240 A1* | 10/2001 | Neher | 342/357.07 |
| 2003/0210186 A1* | 11/2003 | Sollenberger et al. | 342/387 |
| 2005/0096102 A1* | 5/2005 | Mock et al. | 455/574 |
| 2005/0239443 A1* | 10/2005 | Watanabe et al. | 455/414.1 |

* cited by examiner

*Primary Examiner*—Danh C Le

(57) ABSTRACT

A user may locate a missing wireless device through a location server storing user-associated location information. A wireless device includes a client location application adapted to determine a current geographic location and transmit location data to a location server, a power source, and a power management application adapted to detect a low power level and instruct the client location application to determine the current geographic location. The wireless device further includes a GPS receiver adapted to receive and decode GPS signals and a personal GPS directory storing location information associated with the subscriber unit.

15 Claims, 5 Drawing Sheets

SYSTEM AND METHOD FOR RECOVERING A LOST OR STOLEN WIRELESS DEVICE

FIELD OF THE INVENTION

The present invention relates generally to wireless communications systems and more particularly to systems and methods for locating a wireless device.

BACKGROUND OF THE INVENTION

Cordless telephones, such as residential phones, typically include a "page handset" feature for locating a missing telephone handset. If the handset has been misplaced, the user may press a button on a base station causing the handset to produce an audible alert signal identifying the location of the handset.

A misplaced cellular phone may be located by calling the cellular phone and listening for the audible ring. One drawback of this method is that the caller must be in the vicinity of the cellular phone so that the audible ring may be heard. Cellular phones, however, may be misplaced anywhere the user travels. For example, after a day of sightseeing throughout a city, the user may not know where or when the cellular phone was lost. When a cellular phone is lost in public, it could be stolen or subject to fraud or other unauthorized use, so quickly locating the phone is usually desired.

Another drawback to locating a cellular phone by placing a call to the phone is that ringer must be set at an adequate volume to allow the ring tone to be heard. A cellular phone operating in silent mode or vibrate mode will be difficult to locate by calling the phone. Further, the window of opportunity in which to locate the phone is also limited by the strength of the battery. The battery on the cellular phone may run down while the phone is lost, preventing the cellular phone from receiving a call from the user when the cellular phone is discovered missing.

Loss prevention systems are known for use in large-scale equipment, such as shipping containers and automobiles. Some of these systems include a receiver made available to police departments to enable the police to locate equipment reported lost. Such systems typically provide a beacon that is activated when the equipment is stolen. Other location-based services, such as the reporting of an automobile location when the automobile airbags deploy, are also known. These systems are not practical for use in cellular phones.

In view of the above, there is a need for an improved system and method for locating a wireless device that has been lost or stolen.

SUMMARY OF THE INVENTION

The present invention is a system and method for locating a lost or stolen wireless device. In one embodiment, a wireless device includes a client location application adapted to determine a current geographic location and transmit location data to a location server, a power source, and a power management application adapted to detect a low power level and instruct the client location application to determine the current geographic location. The wireless device further includes a GPS receiver adapted to receive and decode GPS signals and a personal GPS directory storing location information associated with the subscriber unit. A user may locate a missing wireless device through a location server storing user-associated location information.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 5 is a location server in accordance with an embodiment of the present invention;

DETAILED DESCRIPTION OF PREFERRED EMBODIMENTS

Figure 1:
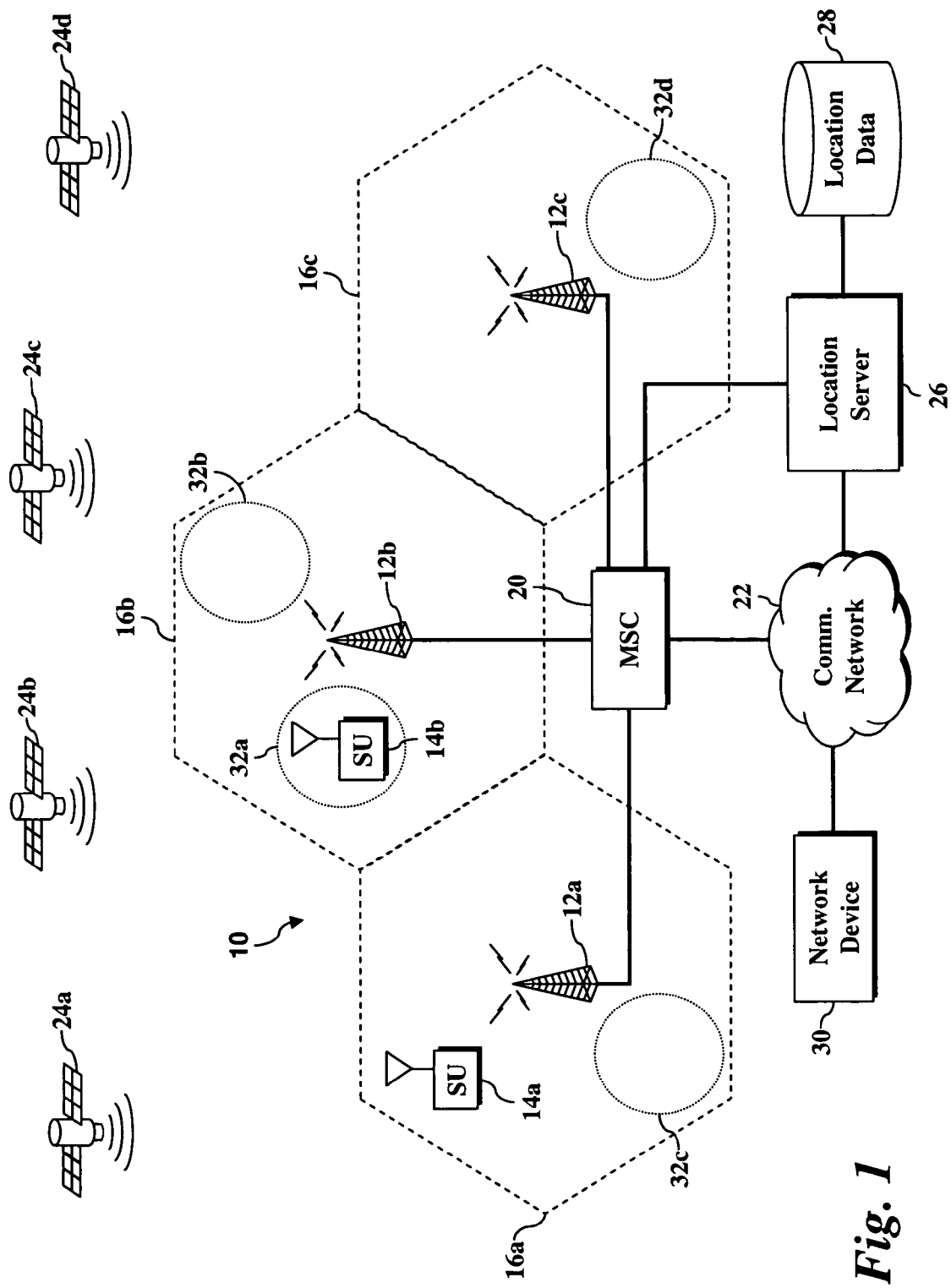
FIG. 1 is a wireless communications system in accordance with an embodiment of the present invention.

An exemplary embodiment of the present invention will now be described with reference to FIG. 1. A wireless communications system 10 is shown as a cell-based communication system including a plurality of base stations 12a-c providing wireless communications services to a plurality of subscriber units 14a-b. Each base station 12a-c has an associated cell 16a-c defining a geographical coverage area serviced by the base station. Each subscriber unit 14a-b positioned within one of the cells 16a-c communicates with the associated base station 12a-c by exchanging data packets according to a predetermined digital communications protocol, such as time division multiple access (TDMA). In the exemplary embodiment, the wireless communications system 10 is an iDEN network, but it will be appreciated that in alternate embodiments the wireless communications system 10 may support other multiple-access wireless communications protocols, such as code division multiple access (CDMA), wideband CMDA (WCDMA), Advanced Mobile Phone Service (AMPS), Global System for Mobile Communications (GSM), General Packet Radio Services (GPRS), High Data Rate (HDR) technology, Push-to-Talk over Cellular (PoC) or voice and data services provided over a broadband network such as WiFi, WiMax, any 802 protocol or similar system.

The wireless communications system 10 facilitates at least one mode of communication such as interconnect, dispatch, email, short messaging service (SMS), multimedia messaging service (MMS) and packet data communications. Each subscriber unit 14a-b may be any device that is adapted for communication with the base station 12a-c such as a mobile phone, pager, personal digital assistant (PDA), a Personal Computer Memory Card International Association (PCMCIA) card, or portable computer.

A mobile switching center (MSC) 20 manages the wireless communications in the cells 16a-c, including call set-up, routing calls between the subscriber units 14a-b and routing calls between the subscriber units 14a-b and at least one communications network 22, such as a public switched telephone network (PTSN) or a data network such as the Internet. It will be appreciated that the wireless communications system 10 of the exemplary embodiment may include other iDEN components, including a plurality of MSCs, each managing a plurality of cells 16.

In the exemplary embodiment, the subscriber units 14a-b are adapted to determine their respective geographic positions using the Global Positioning System (GPS) operated by the United States Department of Defense. The GPS includes a network of 24 satellites that orbit the earth in six circular planes. The GPS satellites are spaced so that, at any given time and from any geographic position, at least five GPS satellites will be above the horizon. In operation, each GPS satellite continually broadcasts its present position and current time. Each subscriber unit 14a-b is equipped with a GPS receiver adapted to extract the information contained in the GPS broadcast signals to compute the subscriber unit's geographic position in terms of its longitude, latitude and altitude. In one embodiment, the GPS receiver searches for and collects the signals broadcast from one or more GPS satellites that are in view. Next, using the time interval between the broadcast time and reception time of each broadcast signal, the GPS receiver calculates the distance between the GPS receiver and each of the identified GPS satellites. These distance measurements, along with the position and time information received in the broadcast signals and other information known to the subscriber unit, enable the GPS receiver to calculate its geographic position.

In one embodiment, the subscriber unit 14b receives position information through the local base station 12b to assist the subscriber unit 14b in locating its position quicker. The base station 12b which is located at a fixed, known position, may track the positions of the GPS satellites that are in view and transmit the identities and positions of these GPS satellites, along with other position information such as the associated Doppler frequencies of the broadcast signals, to subscriber units in the base station's coverage area. The position information enables a GPS warm start by informing the subscriber unit 14b of the approximate location of the GPS satellites to reduce time needed to acquire the GPS broadcast signals. It will be appreciated that other position determination methods may also be used, including systems that calculate the distances between a subscriber unit and two or more base stations using the time difference of signals sent between the wireless device and the base stations.

A location server 26, is connected to the wireless communications system 10 through the communications network 22. In one embodiment, the location server is an extension of a home location register (HLR) of the wireless communication system 10. The location server 26 includes a database 28 storing location-based data for the subscriber units 14a-b on a per subscriber basis, A network device 30 is adapted to communicate with the location server 26 to access the location-based data 28 and available location-based services. In the exemplary embodiment, the location server 26 includes a mobile positioning center and a web server adapted to serve web content to the network device 30 through the Internet.

In operation, the subscriber unit 14b includes a client location application allowing the subscriber to bookmark and name certain locations for storage in a personal list of locations. In one embodiment, the subscriber instructs the subscriber unit 14b to determine its current geographic location 32a using the GPS satellites 24a-d. The subscriber may store a plurality of locations 32a-d in the subscriber unit 14b. The stored locations may also be transmitted to the location server 26 and stored in the database 28. The subscriber may name each location as desired (e.g., favorite restaurant, home, friend's house) and these locations may be used to provide the subscriber with additional location-based services. If the subscriber unit 14b is lost or misplaced, the network device 30 may be used to access the location server 26 to find the last reported location of the subscriber unit 14b.

Figure 2:
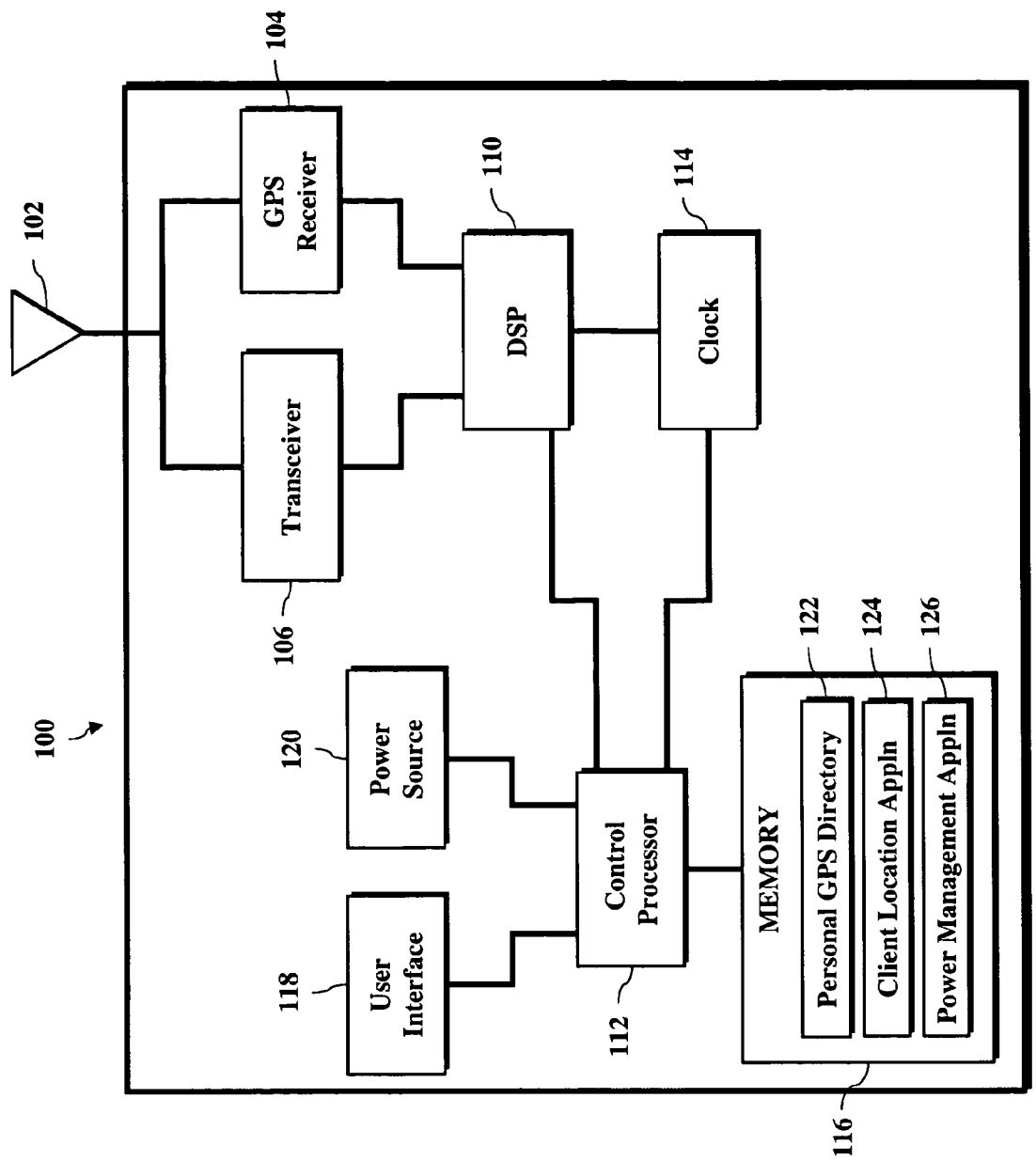
FIG. 2 is a subscriber unit in accordance with an embodiment of the present invention.

A preferred embodiment of a subscriber unit 100 will now be described with reference to the block diagram of FIG. 2. The subscriber unit 100 includes at least one antenna 102 adapted to transmit and receive radio frequency (RF) signals. RF signals received by the antenna 102 are selectively routed to a GPS receiver 104 and a communications transceiver 106. The receivers 104 and 106 are coupled to at least one digital signal processor 110, which controls the signal processing of the received GPS satellite signals and wireless communications signals. The digital signal processor 110 is coupled to a control processor 112, which controls the operation of the subscriber unit 100. The digital signal processor 110 and control processor 112 may be implemented as a single processor, a plurality of processors or a combination of processors and dedicated circuitry including application specific integrated circuits (ASICs). The control processor 112 is coupled to a timing source 114, which maintains a local time for the subscriber unit 100, a memory 116, and a user interface 118. The memory 116 includes a random access memory and a program memory which stores execution instructions for controlling the digital signal processor 110 and control processor 112. In one embodiment, the subscriber unit 100 is an iDEN mobile telephone, and the user interface 118 includes circuitry and components for providing a user of the subscriber unit 100 with a numeric keypad for user input of telephone numbers and other information, and a visual display.

The GPS receiver 104 includes circuitry for receiving GPS signals and converting the received GPS signals to digital. The digital signal processor 110 is adapted to locate the PN codes in the GPS signals, extract satellite information from the GPS signals, calculate pseudoranges and determine the current geographic position of the subscriber unit 100. The communications transceiver 106 includes circuitry for receiving communications signals and converting received communications signals to digital for processing by the digital signal processor 110. The communications transceiver 106 also includes circuitry for converting digital signals to analog and transmitting the analog signals across a wireless communications link through the antenna 102. In one embodiment, the subscriber unit 100 is a mobile telephone and the digital signal processor 110 and control processor 112 are adapted to process, transmit and receive voice and data communications through the communications transceiver 106. The subscriber unit 100 further includes a power source 120, such as a battery, providing the power to operate the subscriber unit 100.

Figure 3:
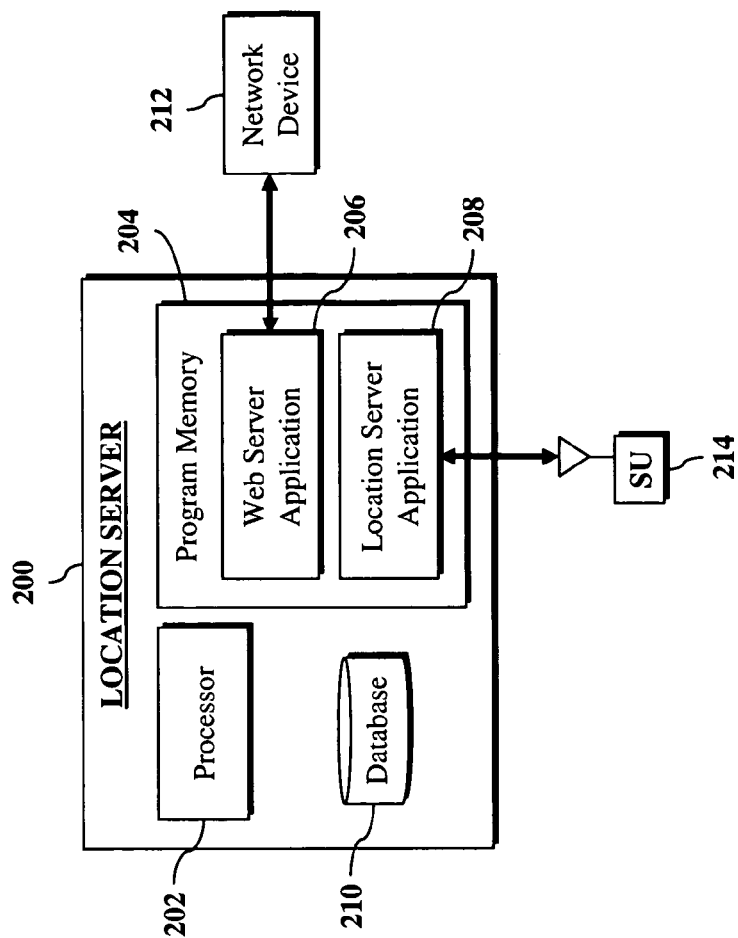
FIG. 3 is an exemplary personal GPS directory data structure.

The memory 116 includes a personal GPS directory 122 for the subscriber unit 100, a client location application 124 for retrieving a current subscriber unit 100 location and communicating with a location server, and a power management application 126 for managing the power source 120. The personal GPS directory 122 includes a list of user stored subscriber unit 100 locations. An exemplary table for storing personal GPS directory 122 entries is illustrated in FIG. 3. The table 140 includes a location name 140a, assignable by the user, location information including a system id 140b, a network id 140c, location coordinates 140d, such as longitude and latitude, a time and date 140e of the coordinates acquisition and a resolution 140f identifying the accuracy of the location information. In one embodiment, the personal GPS directory 122 includes a system entry, GASP (Get Absolute Stored Position), storing a most recent location of the subscriber unit 100. In alternate embodiments, other information may be included in the table 140 such as the location acquisition method and accuracy, for example the number of GPS satellites used to determine the location.

Through the personal GPS directory 140, a user of the subscriber unit can build a library of locations with user-friendly names for their own use. The user may mark a location by entering a feature code or menu selection from the client location application 124 and then adding text to describe the location. Storing locations enables the user to later re-find a stored location, get directions to a stored location, get an address of a previously visited location, and determine services local to the stored location. Further, this directory is also stored on the Internet for the user and is available through an internet connection.

Through the location library, the user has the ability to identify a resolution of the location such as "low," "medium" or "high." Low resolution would mark the location of the stored position as the footprint of the cell site serving the user. Medium could provide GPS location to the accuracy of three satellites or 100 meters. High could provide a GPS location to the accuracy of five or more satellites and could provide location accuracy to three meters. In one example, a college student could specify a location as university (low), building (medium) or locker (high) as desired.

In another example, a user may store a fishing location on a lake in order to find the location on a subsequent visit. The user may press a menu selection on the subscriber unit and store the location (as he would a phone number) and add a descriptive text to the stored location. The next time the user returns to the lake, a "driving directions" type application on the subscriber unit may direct the user to the original spot via a graphic arrow on his display and a distance indication. Upon arriving at the stored location, the handset application could provide the user with a message such as "You have arrived at [name]." The user could also forward the location to other subscribers via SMS, or make the location accessible to other users via the location server.

Referring back to FIG. 2, the power management application 126 includes power management software adapted to maximize the operational life of the subscriber unit 100. A number of techniques may be used for managing the power consumption as known in the art. In one embodiment, the power management application 126 causes the subscriber unit 100 to enter a sleep mode when not in active use and to awaken at pre-determined intervals to check for pages, alerts or other messaging. The power management application 126 may also cause the subscriber unit 126 to enter into a battery save mode if no wireless service is available. Other features may include keeping the transmit power to the minimum required strength to preserve battery life and dimming the display and turning off of unneeded indicators when not in use.

In the power management application 126, the subscriber unit 100 provides the user with "low battery" indications as the battery strength falls below certain "fading" threshold strengths. If a subscriber unit is lost, its battery will eventually run down due to battery exhaust, ceasing operation. In the exemplary embodiment, the power management application 126 includes a Last GASP (Lost and Stolen Telephone, Get Absolute Stored Position) function that initiates GPS location determination as the battery power falls below certain exhaust thresholds. The Last GASP function systematically provides the subscriber unit's position to the location server at a time before the exhaust of power. The location server stores the subscriber's Last GASP position in the data storage. The subscriber unit's velocity and direction of movement may also be stored. In one embodiment, the Last GASP position is also stored by the HLR of the wireless network.

An embodiment of the operation of the power management application 126 will now be described with reference to FIG. 4. The process moves forward in small steps in a manner to assure that the process completes prior to the expected battery exhaust. As the phone finally reaches the last threshold indicating power is about to be lost to the device, the final position is determined and stored in the GASP entry and transmitted to the Internet-based server which holds the user location information.

In the first step 150, while the battery level is above 50% the subscriber unit is in a "normal" operating mode and the power management application need not take additional actions. If the subscriber unit location is determined by the client location application, then the location information is stored automatically in the Last Gasp Memory of the subscriber unit. If this information is different than the last stored position, then the new information is forwarded to the location server.

In the second step 152, when the battery is in the decline state at a power level of 50% to 35%, the subscriber unit initiates actions to acquire GPS satellites. Since this process may take some time, this process starts and continues until the GPS satellites are located or until the battery level drops below this range band. GPS aiding information from a local base station may assist the subscriber unit in locating the available GPS satellites, reducing the time and battery power required to acquire the available satellite signals.

In the third step 154, when the battery level is in the 35% to 15% range, the subscriber unit calculates its current position using the location information that is available and updates the subscriber unit's Last GASP memory location. The subscriber unit's direction and velocity may also be calculated and stored.

In the fourth step 156, as the subscriber unit's battery range drops below 15% the subscriber unit transmits its position to the location server, continually updates its position, and sends the updated position information to the location server if the location changes. In the fifth step 158, at a point prior to voluntary shutdown, e.g., the minimum available power that permits the completion of step 158 and a voluntary shutdown procedure, the subscriber unit transmits a final position and refrains from further location processing to preserve battery power. In the sixth step 160, the subscriber unit executes the voluntary shutdown procedure, including deregistration and shifting the power to zero.

Figure 4:
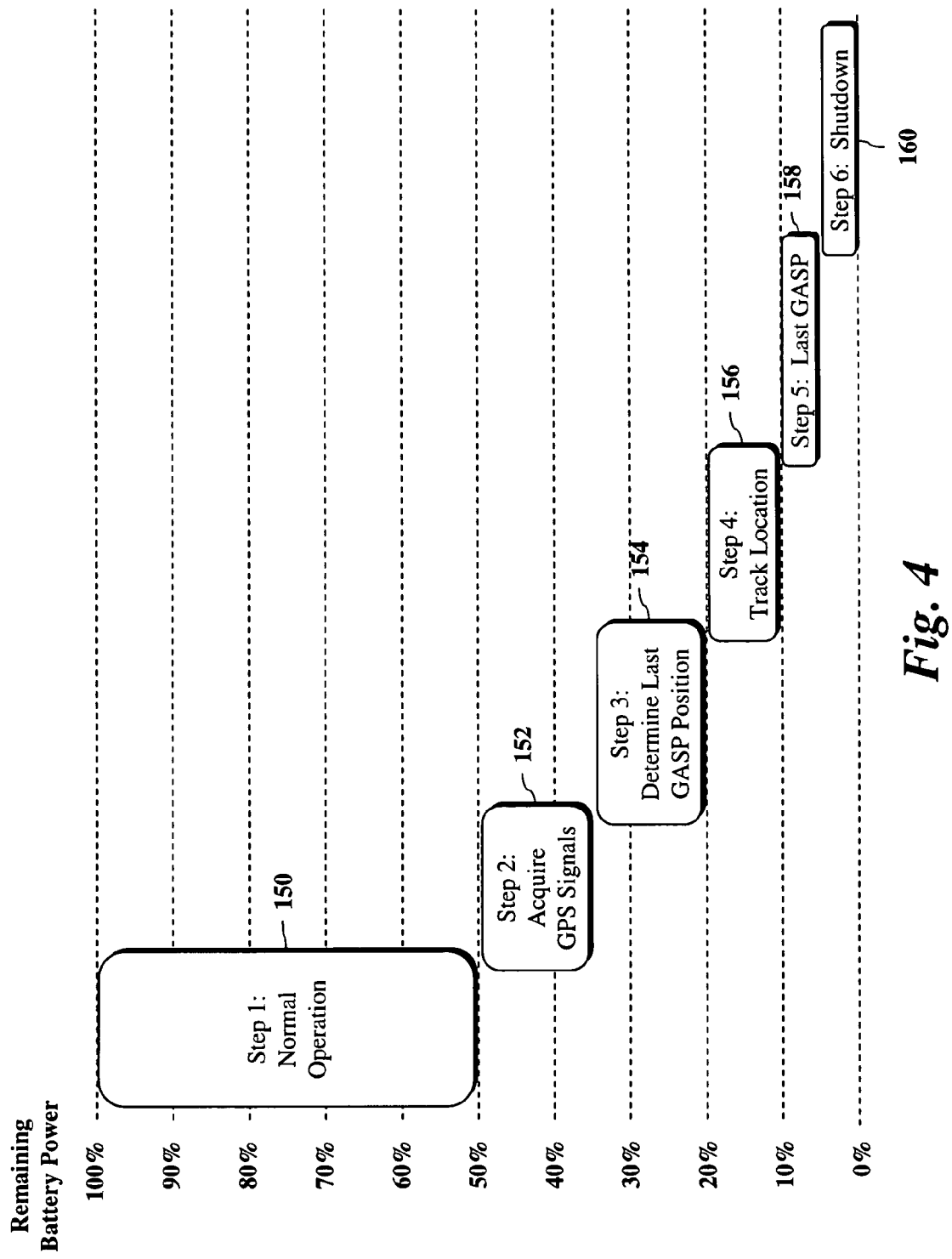
FIG. 4 is a flow diagram illustrating an embodiment of an operation of a power management application.

It will be appreciated that the percentage ranges illustrated in FIG. 4 are exemplary and may differ in other embodiments. Predetermined thresholds for each step may be established for a particular subscriber unit to allow the process to be completed in an efficient manner. A subscriber unit manufacturer may produce a model of the subscriber unit's battery consumption upon which thresholds may be derived.

If the subscriber unit is damaged (e.g., the user drops a mobile phone), if the battery falls out or the subscriber unit otherwise suddenly loses power, then there would not a chance for a last GASP process to execute. In one embodiment, the HLR maintains a position history for the subscriber unit and if the Last GASP procedure is not completed, then the position history from the HLR may be provided to a user requesting the location of a subscriber unit along with a notification that the Last GASP position is not available. In another embodiment, a user may have multiple subscriber units (e.g., an email device and a cell phone) and an estimate of the lost subscriber unit's position may be determined using the location of the second device—particularly if the two devices were in the same position when one ceased functioning.

An embodiment of a location server is illustrated in FIG. 5. The location server 200 includes a processor 202, a memory 204 and a database 210. The memory 204 includes program instructions for instructing the processor to operate as a web server 206 providing access to web devices such as network device 212. The memory 204 also includes a location server application 208 for instructing the processor 202 to perform location functions as described herein, including providing an interface to a subscriber unit 214, and performing last GASP functions.

Figures 6, 7:
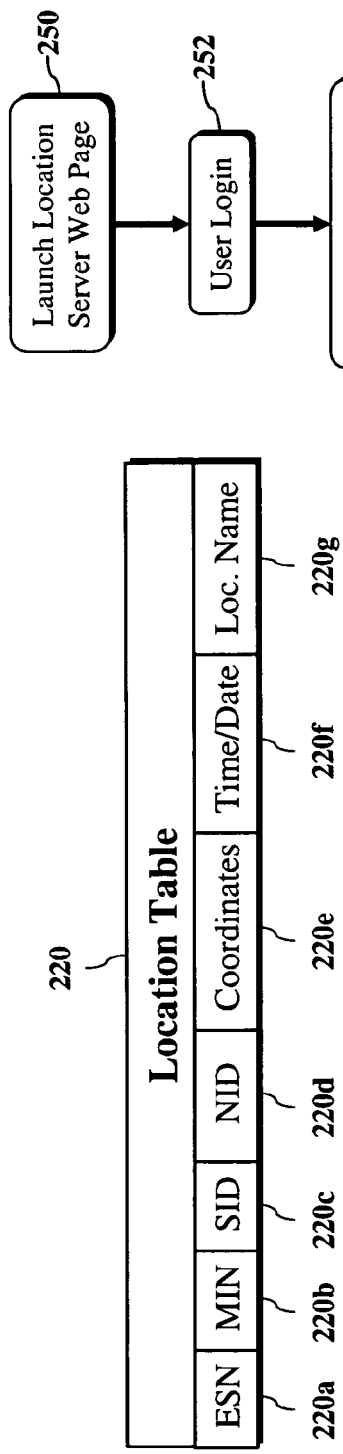
FIG. 6 is an exemplary database structure for use by the location server of FIG. 5.
FIG. 7 is a flow diagram illustrating an embodiment of a web application providing location services.

The database 210 stores location information for the subscriber unit 214 and other subscriber units with compatible location-based capabilities. An exemplary location table 220 storing subscriber locations is illustrated in FIG. 6. The location table 220 includes a plurality of records, each record identifying the subscriber unit via ESN 220a and MIN 220b, a wireless system identifier 220c, a network identifier 220d, GPS coordinates 220e, the date and time 200f of the location measurement and a location name 220g assigned by the user. In one embodiment, the table 220 includes a system entry referred to herein as a GASP (GPS Absolute Stored Position) entry. The GASP entry is a memory location that stores the current location of the subscriber unit. At anytime, when the subscriber unit performs a task that requires GPS location, the determined location is stored in the GASP memory. Further, each time the mobile is handed off from one cell site to another, the GASP is updated with the known and fixed location of the cellular tower which enables the GPS position to be found more quickly.

An exemplary operation of a location server web interface is illustrated in FIG. 7. If the subscriber unit is lost, a user can go online and determine the last location of the subscriber unit from the LAST GASP indicator. Through the online system, the user can initiate actions to disable the associated cellular service or ring the subscriber unit if the indicator shows that the device has not yet powered down. Further, the user can manage incoming calls to the lost subscriber unit by instructing the wireless network to forward all incoming calls to an alternate number or to voicemail directly, By maintaining location data on a per subscriber basis, a user may lose a first device (e.g., a wireless email device) and information on a second device may be used to assist with the location of the first device. Historical information can also be kept for different modes of a dual mode phones to track uses on multiple systems (e.g., CDMA and GSM).

The web application allows review and editing of stored location information and the determination of the last location of the subscriber unit prior to battery exhaust. The web application also includes functions for storing locations on a quality of location basis, enabling the ringing or alert sound of a subscriber unit (if alive) from the web, enabling the user to suspend the associated service and provide a customer announcement when the user becomes aware of a lost device.

The location server may also enable the user of an other phone to access the same information via the web or an interactive voice response (IVR) system (which may be associated with the voicemail platform or may be independent). Via IVR or web application, the user may suspend its wireless service and provide a custom announcement in the user's own voice (or default announcement) when a lost subscriber unit is suspected.

The user may access the location server to determine a current location of the subscriber unit. In step 250, a user operating a network device accesses the location server via a web page launched by the web application. In step 252, the user identity is verified, such as through a username and password associated with the subscriber unit. These location-based services may be an additional capability added to the carrier's web presence, which may include online billing and online ordering. In step 254, a request for the location of an associated subscriber unit is received from the network device. The location application queries the subscriber unit in step 256 via the wireless network for its current location. If the subscriber unit is available in step 258, it responds with its current location, which is displayed on the user's web browser. If the subscriber unit does not respond, then in step 260 the last GASP location is returned to the subscriber unit. A location name associated with the subscriber unit location may also displayed for the user.

An exemplary data flow will now be described in greater detail with reference to FIG. 1. The subscriber unit 14b at a location 32a initiates the GASP application on the subscriber unit 14b to determine the current location 32a. The GASP application determines the location of the subscriber unit 14b and stores that location in a local personal GPS directory. The user can specify a name for the location 32a (e.g., my office) and select whether the location information is to be stored as high, medium or low resolution. The location information is also stored in the subscriber unit's GASP entry and forwarded to the location server 26 via the MSC 20. In one embodiment, the location information is also forwarded to an HLR for use by the wireless communications system 10.

The user can access the stored locations from the subscriber unit, or from the location server 26 via a public Internet and the secure website. The user may modify, delete or forward the information to other users as desired. In one embodiment, the location information stored in the location server 26 can be downloaded to one or more subscriber units to repopulate the subscriber unit's memory with the stored location information.

If the subscriber unit 14b is lost, the subscriber unit will initiate the Last GASP procedure as the battery power level drops. Before the battery power is exhausted, the subscriber unit's current location is provided to the location server 26. When the user realizes that the subscriber unit 14b is lost, the user may access the location server 26, provide a user name and password and select a "lost phone" option. In one embodiment, the identity of the user is further authenticated to ensure that the user is authorized to locate the subscriber unit 14b.

If the battery is still active, the location server 26 transmits an instruction to the subscriber unit to update and return its current location. Otherwise, the user is shown the last location of the subscriber unit 14b as stored in the Last GASP entry. The subscriber unit location may be shown as a GPS position and, if the user has previously stored this location, the location may be provided as a "user friendly name" associated with that location.

Through the lost phone application, the user may be provided with a number of options. The user may elect to temporarily suspend service to the subscriber unit and direct all incoming calls to voicemail until the subscriber records the device. In another embodiment, once the location of the subscriber unit is determined, the location server can instruct the subscriber unit to play intermittently an audible ring tone or alert until the user finds the subscriber unit and presses "end," the subscriber unit loses power, or the user cancels the request.

If the subscriber unit is in a powered position, it can be ordered into sleep mode or power off mode. Other options are envisioned, including the ability for the user to redirect incoming calls to another number until the subscriber unit is recovered, change the user profile to a hotline mode so that any attempts at communication with the phone are directed to a desired number notifying the caller that the subscriber unit is lost and providing instructions on how to return the subscriber unit. The user may also permanently disassociate the service with the subscriber unit and notify the wireless communications system 10 of the lost subscriber unit.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. A method for locating a subscriber unit comprising:
   detecting a power level of the subscriber unit below a first threshold level;
   automatically determining a geographic position of the subscriber unit;
   detecting the power level of the subscriber unit below a second threshold level; and
   automatically transmitting the geographic position to a location server before the power is exhausted.

2. The method of claim 1 further comprising receiving at the location server a request for subscriber unit geographic position, and returning a most recently received geographic position associated with the subscriber unit.

3. The method of claim 2 wherein the received geographic position has an associated location name, and wherein the location name is returned to the requestor.

4. The method of claim 2 wherein navigation instructions are returned to the requestor.

5. The method of claim 1 wherein the step of determining includes receiving a signal from each of a plurality of GPS satellites.

6. A wireless device comprising:
   a client location application adapted to determine a current geographic location and transmit associated location data to a location server;
   a power source; and
   a power management application comprising program instructions for instructing the wireless device to,
   detect a power level of the power source below a first threshold,
   acquire GPS satellite signals until the power level drops below a second threshold, and
   determine a last geographic position when the power level drops below the second threshold, the last geographic position being determined based on the acquired GPS satellite signals.

7. The wireless device of claim 6 further comprising a GPS receiver adapted to receive and decode GPS signals.

8. The wireless device of claim 6 further comprising a personal GPS directory storing location information associated with the subscriber unit.

9. The wireless device of claim 6 wherein the program instructions further comprise:
   tracking a current location when the power level drops below a third threshold.

10. The wireless device of claim 9 wherein the program instructions further comprise:
    transmitting the last geographic position to a location server after the power level drops below a fourth threshold.

11. A wireless device including an power source and program instructions for causing the wireless device to perform steps comprising:
    detecting a power level of the power source below a first threshold level;
    determining a geographic position of the wireless device;
    detecting a power level of the power source below a second threshold level; and
    transmitting the geographic position to a location server before the power is exhausted.

12. The wireless device of claim 11 further comprising receiving at the location server a request for subscriber unit geographic position, and returning a most recently received geographic position associated with the subscriber unit.

13. The wireless device of claim 12 wherein the received geographic position has an associated location name, and wherein the location name is returned to the requestor.

14. The wireless device of claim 12 wherein navigation instructions are returned to the requestor.

15. The wireless device of claim 11 wherein the step of determining includes receiving a signal from each of a plurality of GPS satellites.

* * * * *